United States Patent
Rich et al.

(10) Patent No.: US 7,540,260 B2
(45) Date of Patent: Jun. 2, 2009

(54) COMPRESSION SPRING OPERATED SQUIRREL PROOF BIRD FEEDER

(75) Inventors: Christopher T Rich, Leola, PA (US); Robert T. Cruz, Wrightsville, PA (US); Edward J. Holliday, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 136 days.

(21) Appl. No.: 11/593,038

(22) Filed: Nov. 6, 2006

(65) Prior Publication Data

US 2008/0105206 A1  May 8, 2008

(51) Int. Cl.
A01K 61/02  (2006.01)
(52) U.S. Cl. ............ 119/57.9; 119/57.8; 119/57.3; 119/429
(58) Field of Classification Search .......... 119/57.9, 119/57.8, 52.2, 52.3, 429, 63, 51.01, 52.4; D30/124, 125, 127, 128, 126
See application file for complete search history.

(56) References Cited

U.S. PATENT DOCUMENTS

| | | | | |
|---|---|---|---|---|
| 3,145,690 A | * | 8/1964 | Bachman | 119/52.3 |
| 4,646,686 A | | 3/1987 | Furlani | |
| 5,445,109 A | * | 8/1995 | Gray et al. | 119/57.9 |
| 5,720,238 A | * | 2/1998 | Drakos | 119/57.9 |
| 5,826,540 A | * | 10/1998 | Bridges | 119/52.3 |
| 5,964,183 A | * | 10/1999 | Czipri | 119/52.3 |
| 6,253,707 B1 | | 7/2001 | Côté | |
| 6,543,384 B2 | * | 4/2003 | Cote | 119/57.9 |
| 6,561,128 B1 | * | 5/2003 | Carter | 119/57.9 |
| 6,591,781 B2 | * | 7/2003 | Hardison | 119/57.9 |
| 6,918,353 B1 | * | 7/2005 | Coroneos | 119/57.1 |
| 6,945,192 B2 | | 9/2005 | Côté | |
| 7,191,731 B2 | * | 3/2007 | Cote | 119/57.9 |
| 2006/0260553 A1 | | 11/2006 | Cote | |

OTHER PUBLICATIONS

336 Squirrel-be-Gone Wild Bird Feeder (4 color photos).

* cited by examiner

*Primary Examiner*—Andrea M Valenti
(74) *Attorney, Agent, or Firm*—Jacobson Holman PLLC

(57) ABSTRACT

A bird feeder has telescopically aligned inner and outer cylindrical housings with opposed surfaces of complementary shape that are reverse tapered in a substantially vertical direction to enable guided vertical movement of the housings with respect to each other. The housings have openings in their side walls which are substantially in alignment when the outer housing is in an upper position and misaligned when the outer housing is in a lower position. A compression spring centrally located about the vertical axis of the feeder is confined within a lower portion of the feeder and biases the outer housing to its upper position. When the outer housing is moved to its lower position by the weight of a squirrel overcoming the biasing force of the compression spring, the housing openings are substantially misaligned such that no significant through opening exists, thereby preventing access to the birdseed.

18 Claims, 8 Drawing Sheets

COMPRESSION SPRING OPERATED SQUIRREL PROOF BIRD FEEDER

BACKGROUND OF THE INVENTION

1. Field of the Invention

The present, invention is generally directed to an improved bird feeder of desirably simple and economic construction and, more specifically, to a bird feeder that is squirrel proof and that can be adapted to a wide variety of uses so as to be fairly characterized as a general purpose bird feeder.

2. Description of the Prior Art

There have been numerous attempts over the years to design a bird feeder that is squirrel proof. Certain of these feeders are designed for a specific purpose or installation and are relatively squirrel proof when so used. As a general purpose bird feeder, however, such designs have proven inadequate. Conversely, general purpose bird feeders have been found lacking with regard to their squirrel proof capability.

The above-described problem is known in the prior art and several patents disclose feeders which accomplish the squirrel proof objective in ways different from each other and from the invention described in detail hereinafter. For example, U.S. Pat. No. 4,646,686 to Fulani discloses a selective bird feeder having a cylindrical, transparent feed container located inside a concentric, coaxial, transparent shroud. The upper end of the shroud is supported above a shoulder near the upper end of the container by a compression spring which permits the shroud to move between an upper bird feeding position and a lower feed blocked position caused by the weight of a squirrel or large birds resting on the shroud.

U.S. Pat. No. 5,720,238 to Dracos discloses a bird feeder having an inner housing fixed vertically and an outer housing telescopingly received about the inner housing and movable between upper and lower positions. The housings have openings that are aligned when the outer housing is in its upper position so that the openings serve as feed ports. When the outer housing is in its lower position, the openings are misaligned to close the feed ports. External tension springs are provided to bias the outer housing toward its upper position, but allow the outer housing to move downwardly to its lower position under the weight of a squirrel or the like.

There is, therefore, a need for a general purpose squirrel proof bird feeder that can be readily manufactured at a reasonable cost, and that is reliable, sturdy, and long-lasting.

SUMMARY OF THE INVENTION

An object of the present invention, therefore, is to provide a bird feeder that is suitable for general purpose feeding of birds, and that is also squirrel proof. More particularly, it is an object of the present invention to provide a squirrel proof bird feeder having inner and outer housings capable of structural cooperation so as to provide access to birdseed through aligned openings in the cooperating housings when birds are present, and to restrict access to birdseed when a squirrel is present.

In accordance with one embodiment of the present invention, a compression spring operated squirrel proof bird feeder has an inner tubular housing and an outer tubular housing or shroud telescopically surrounding the inner housing. The opposed surfaces of the housings have a complementary shape for structural mating purposes. The outer housing or shroud includes a perch assembly associated therewith, and is vertically slidable on and about the inner housing between an upper position and a lower position. A bird seed storage container is mounted above the inner housing to feed bird seed to the inner housing by gravity. When the outer housing is in its upper position, the housings are in their structurally mating position; when the outer housing is in its lower position, the housings are not mated.

The complementary shape of the opposed surfaces of the cooperating housings are preferably reverse tapered with respect to each other in a substantially vertical direction so as to enable telescopically guided movement of the housings both toward and away from the complementary surfaces. The mating housings are preferably substantially cylindrical in shape and have an associated hanging wire assembly for supporting the inner housing in a fixed substantially vertical position. Preferably, the hanging wire passes through the birdseed storage container and holds the inner housing so that the mating housings may be suspended from a tree limb or the like in a spaced relationship therebeneath.

Each of the housings has at least one opening in a side wall thereof, with the openings in the two housings in substantial alignment and in communication so as to provide a through opening or feed port when the outer housing or shroud is in its upper position and mated with the inner housing. With the outer housing in its lower position, the openings in the two housings are substantially misaligned and in substantial non-communication such that no significant through opening exists. A bottom wall closes off the bottom of the inner housing to support birdseed therewithin for access through the through opening when the two housings are mated and their openings are in aligned communication.

A generally vertical compression spring is operatively connected between the inner housing and the outer housing to urge the outer housing toward its upper position in mating relation with the inner housing. The compression spring is also selected so as not to be overcome by a predetermined weight, such as the weight of an average or typical bird (or of several such birds), but readily overcome by the weight of an average or typical squirrel. Thus, the presence of a squirrel on the perch assembly will cause the outer housing to move to its lower position and close the through opening, thereby restricting access to the birdseed.

In a preferred embodiment, the feeder has a plurality of pairs of cooperating feed openings in the two housings for opening and closing operation, as described, when the outer housing is in its upper and lower positions, respectively.

The compression spring is preferably supported around the base of a spring socket centrally located with respect to the vertical axis of the feeder and adjacent the bottom thereof. The spring socket is supported in a downwardly facing cylindrical opening in the center of the inner housing. The compression spring is retained in position around the spring socket by two radial flanges, one projecting inwardly from the outer housing and the other projecting outwardly from the base of the spring socket. As indicated, the compression spring is selected to maintain the outer housing in its upper position despite the presence of a load on the perch assembly that is less than a predetermined weight. But, the spring force is insufficient to sustain a load on the perch assembly greater than the predetermined weight, whereupon the outer housing descends to its lower position, the through openings are substantially closed, and access to birdseed is restricted until the load is removed.

It is, therefore, another object of the present invention to provide a squirrel-proof birdfeeder which utilizes a single compression spring centrally located in the base of the feeder to urge the outer housing toward its upper position in mating alignment with the inner housing.

Yet another object of the present invention is to provide a squirrel-proof birdfeeder in accordance with the preceding object in which the centrally located compression spring is supported around the base of a spring socket assembled centrally in a downwardly facing cylindrical opening in the inner housing.

A further object of the present invention is to provide a squirrel-proof birdfeeder in accordance with the preceding objects in which the compression spring supported around the base of the spring socket is protected from contact with birdseed in the birdfeeder and other contaminants which might interfere with operation of the compression spring to bias the outer housing toward its upper mating position with the inner housing.

Still a further object of the present invention is to provide a squirrel-proof birdfeeder in accordance with the preceding objects in which the opposed surfaces of the inner and outer housings have reverse tapered complimentary shapes in a substantially vertical direction so as to enable telescopically guided movement of the outer housing with respect to the inner housing.

Yet a further object of the present invention is to provide a squirrel-proof birdfeeder in accordance with the preceding objects which includes a hanging wire assembly connected to the inner housing adjacent its base at substantially its axial center and passing upwardly through a birdseed storage container in communication with and supported above the inner housing for hanging the birdfeeder in spaced relation below a tree limb or other hanging support.

A final object to be recited herein is to provide a squirrel-proof birdfeeder in accordance with the preceding objects, which can be easily manufactured from readily available and known components for ease and economy of manufacture and which will be sturdy and long lasting in operation and use.

These together with other objects and advantages which will become subsequently apparent reside in the details of construction and operation as more fully hereinafter described and claimed, reference being had to the accompanying drawings forming a part hereof, wherein like reference numbers refer to like parts throughout. The accompanying drawings are intended to illustrate the invention, but are not necessarily to scale.

DETAILED DESCRIPTION OF THE PREFERRED EMBODIMENTS

Figure 1:
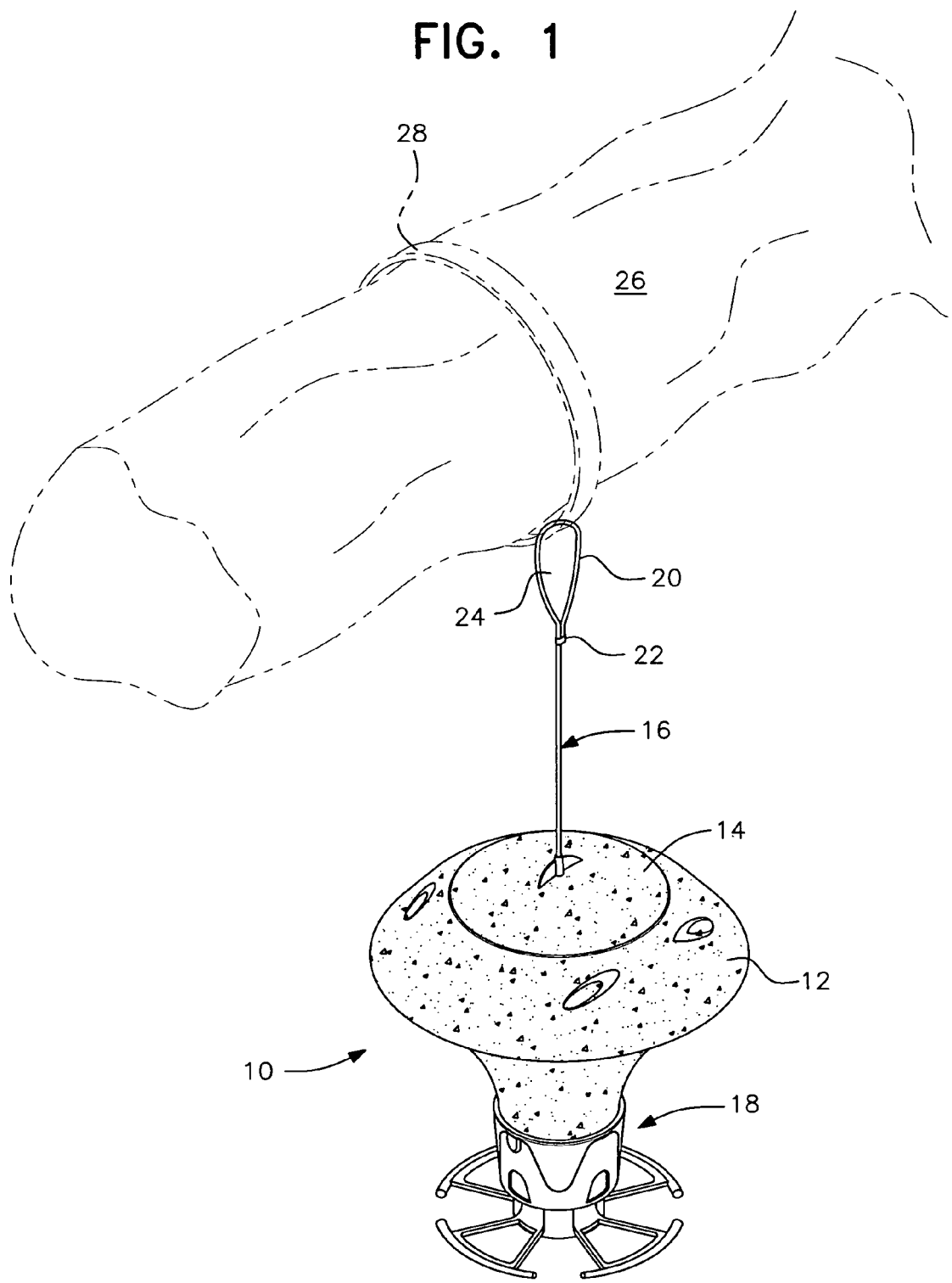
FIG. 1 is a perspective view of a compression spring operated squirrel proof bird feeder according to one embodiment of the present invention, and illustrates the feeder suspended from a tree limb.

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

Figure 2:
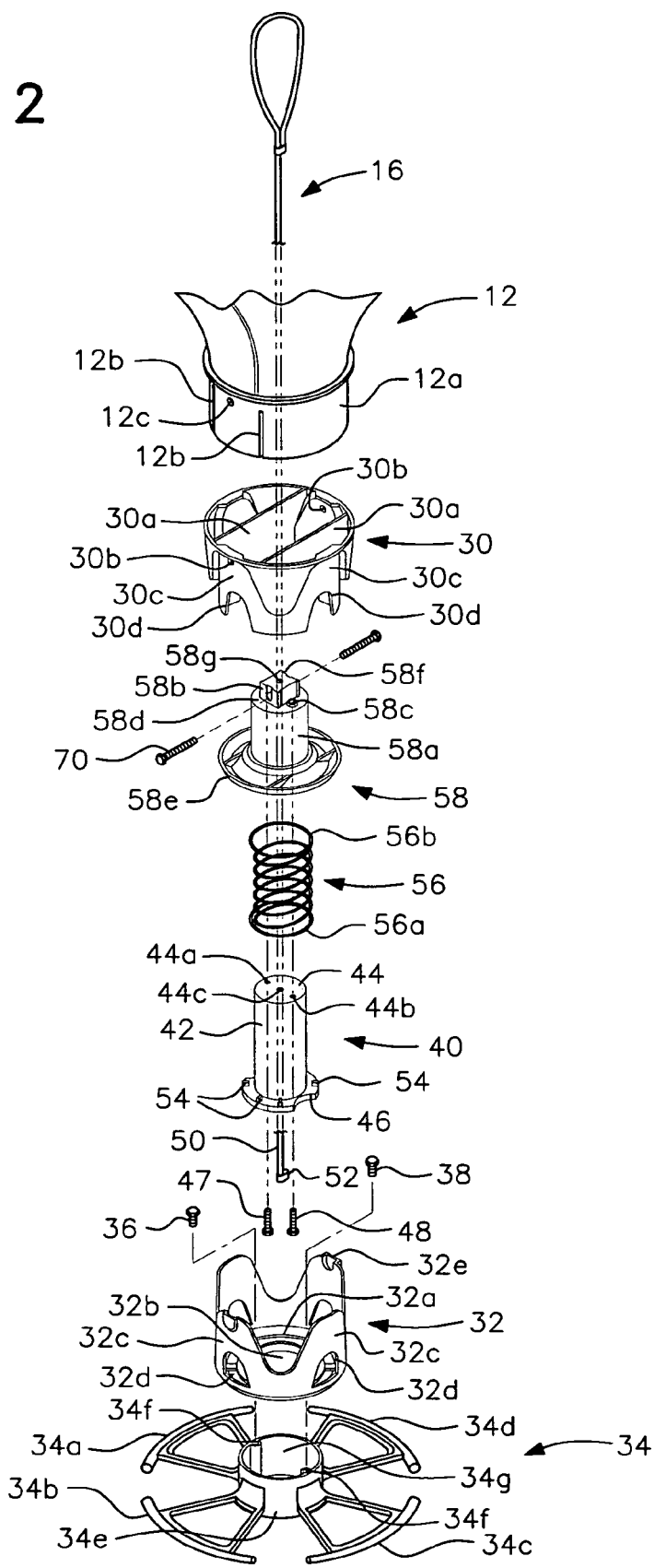
FIG. 2 is an exploded perspective view of a lower portion of the embodiment of the bird feeder illustrated in FIG. 1, and shows a portion of a birdseed storage container, inner and outer housings, the perch assembly, the spring socket, the compression spring, the hanging wire assembly and related assembly components.

FIGS. 1 and 2 illustrate a compression spring operated squirrel proof bird feeder, generally designated by reference numeral 10, in accordance with a preferred embodiment of the present invention. The bird feeder 10 includes a birdseed storage container 12 having a removably mounted lid 14. A hanging wire assembly 16 passes through the container 12 and the lid 14, and is secured at its lowermost end within a bird feeder housing assembly, generally designated by references numeral 18.

An upper end 20 of the hanging wire assembly 16 preferably has a loop and is secured by a crimped metal strap 22 to form a loop opening 24. According to a preferred embodiment, the opening 24 is used to suspend the bird feeder 10 from a support structure, such as a tree limb 26, by a strap 28. Alternatively, in one of many possible variations, the opening 24 may be threaded onto a small branch of sufficient size to provide support for the bird feeder 10, or any other support structure. Alternatively, the feeder 10 can be mounted on a post.

As illustrated in FIG. 2, the housing assembly 18 includes an inner housing, generally designated by reference numeral 30, telescopically received in an outer housing, generally designated by reference numeral 32. The outer housing includes a perch assembly, generally designated by reference numeral 34, having radially outwardly extending vane portions 34a, 34b, 34c, and 34d extending from a central hub 34e. Threaded fasteners such as, for example, screws 36, 38 (see also FIG. 7), extend through a radially inwardly extending rim 32a of the outer housing into threaded passageways 34f of the perch assembly 34 for securing the hub 34e of the perch assembly 34 into the outer housing 32.

The inner housing 30 includes a spring socket, generally designated by reference numeral 40, having a cylindrical wall section 42 terminating at its upper end in horizontal top plate 44. At the bottom end of the cylindrical wall section 42 is a radially outwardly extending support flange 46. Flange 46 preferably includes a plurality of radially extending ribs 54 for strengthening the flange 46 and for supporting one end of a compression spring, generally designated by reference numeral 56, as described in more detail below, on the flange 46. As illustrated, the compression spring 56 is positioned around the vertical axis of the feeder 10 and adjacent its lower end.

Top plate 44 includes holes 44a, 44b for receiving threaded fasteners 47 and 48, respectively, and central hole 44c for receiving a lower end 50 of the hanging wire assembly 16. A crimped metal band 52 and washer 52a (as shown in more detail in FIGS. 5 and 7) on the lower end 50 of the hanging wire assembly 16 prevent the lower end 50 from passing upwardly through the hole 44c in the top plate 44 of the spring socket 40.

The body of spring 56 surrounds the cylindrical wall section 42 of spring socket 40. The lower end 56a of spring 56 is seated on top of flange 46 of spring socket 40. The spring socket 40, with the spring 56 surrounding the cylindrical wall section 42, extends through a central opening 34g of the hub 34e of the perch assembly 34 and the central opening 32b of the outer housing 32. The upper end 56b of spring 56 engages radially inwardly extending rim 32a of the outer housing 32 as will be described in greater detail with reference to FIGS. 5 and 7.

Figure 5:
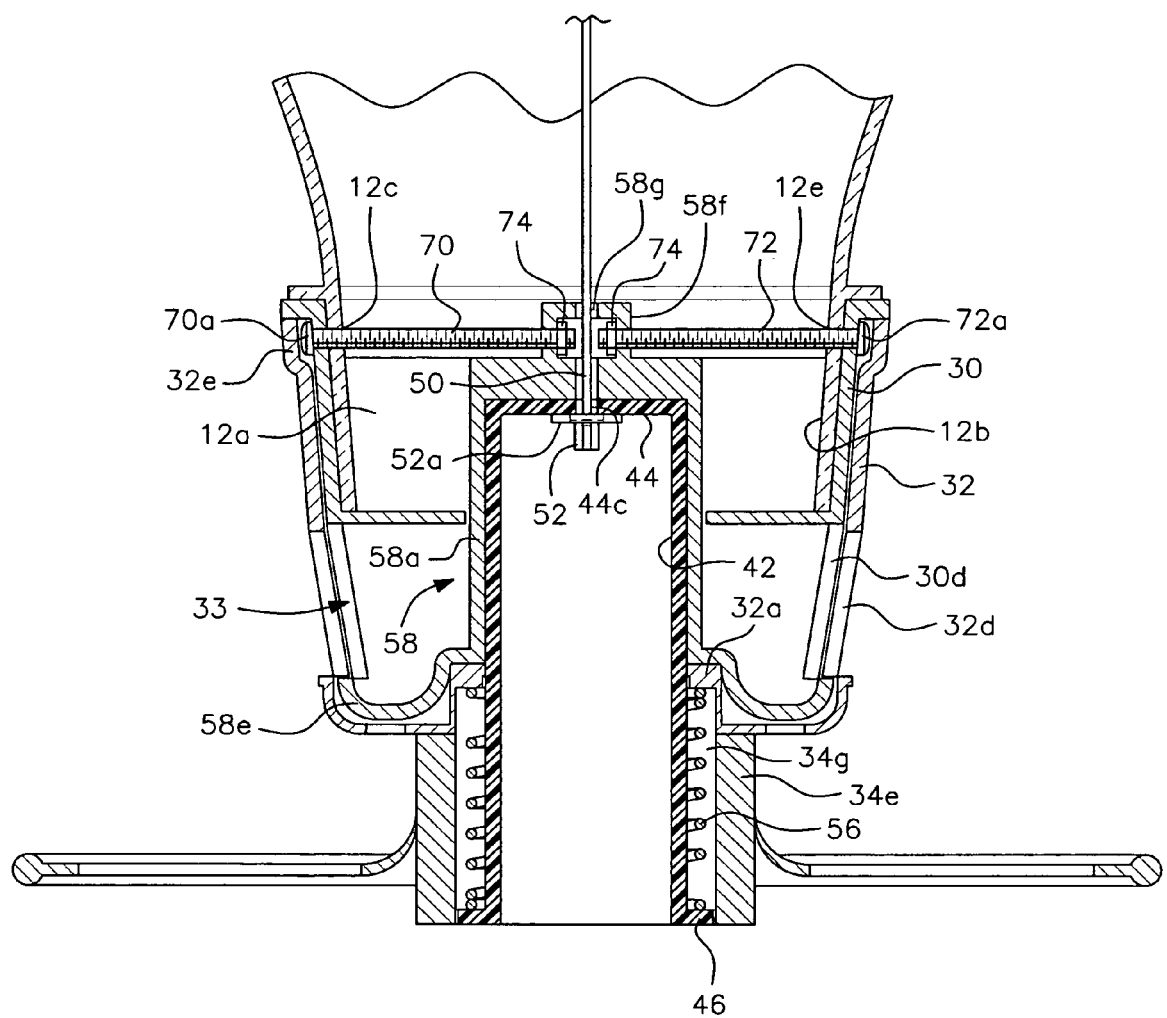
FIG. 5 is a partial sectional view of the bird feeder taken along line 5-5 of FIG. 4.

FIG. 5 shows a partial sectional view of the bird feeder 10 in an uncompressed state. As illustrated, the spring 56 extends only approximately one-half way along the exterior length of the cylindrical wall section 42 of spring socket 40. The remainder of the cylindrical wall section 42 extends into a downwardly facing cylindrical opening defined by the cylindrical body portion 58a of a receptacle, generally designated by reference numeral 58, centrally located within the inner housing 30. The threaded fasteners 47 and 48 are assembled through the interior of cylindrical wall section 42 of spring socket 40 and extend through holes 44a and 44b, respectively, of top plate 44 of spring socket 40 into engagement with holes 58b, 58c in a top surface 58d of receptacle 58 (see FIGS. 2 and 7). A bottom flange portion 58e extends radially from the bottom of receptacle body portion 58a and is seated on top of annular flange portion 32c of the lower housing 32. The lower end 50 of the hanging wire assembly 16 passes through aperture 58g of anchor block 58f.

Figure 3A:
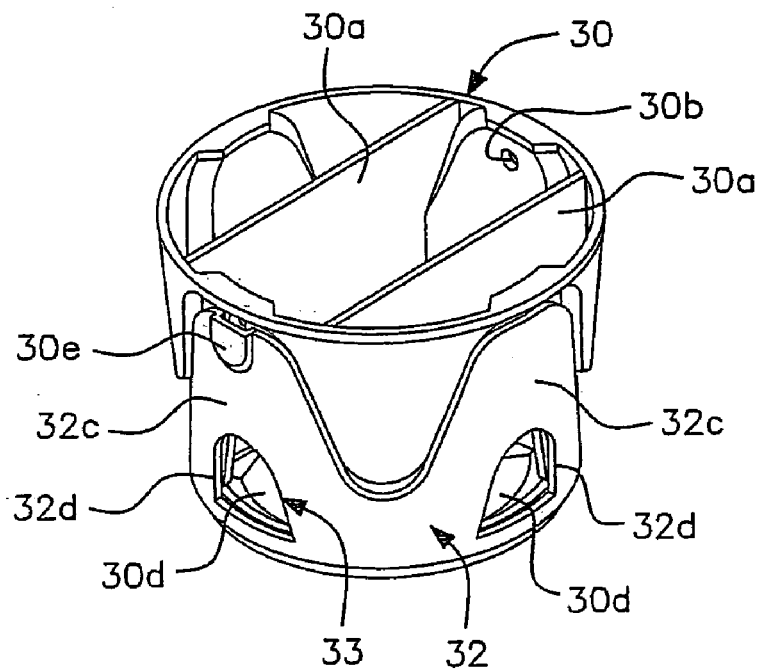
FIG. 3A is a perspective view of the inner and outer housings shown in FIGS. 1 and 2, and illustrates the mating cooperation of the housings in an upper position of the outer housing.
Figure 3B:
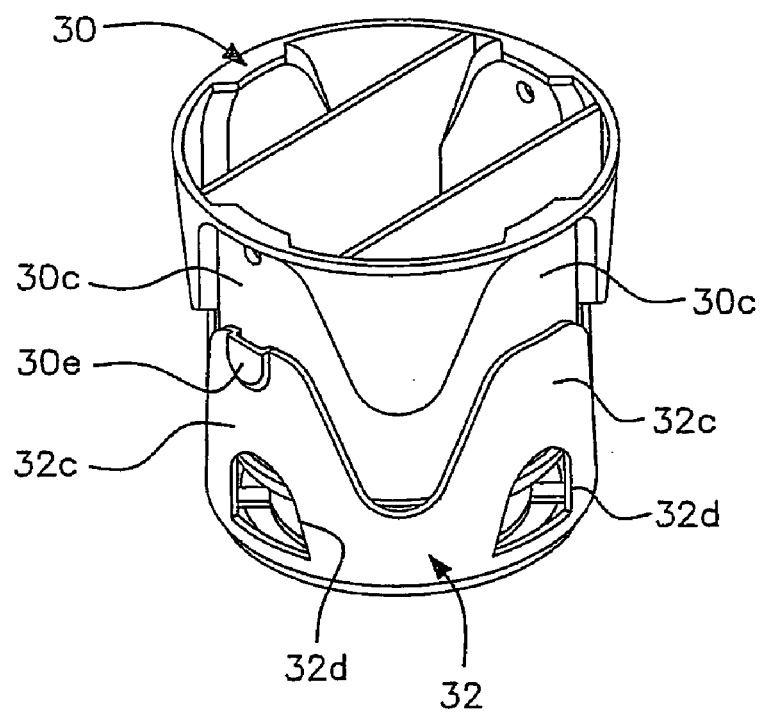
FIG. 3B is a perspective view of the inner and outer housings shown in FIGS. 1 and 2, and illustrates the positions of the housings when the outer housing is in its lower position.

FIG. 3A is a perspective view of the inner and outer housings 30, 32 illustrating the mating cooperation of the housings in the upper position of the outer housing. FIG. 3B is another perspective view of the housings 30, 32 illustrating their positions when the outer housing is in its lower position. As shown, the inner housing 30 and the outer housing 32 cooperate with each other by mating opposed surfaces including a plurality of tapered recesses 30c formed into the exterior surface of the inner housing 30, and a plurality of complementary shaped tapered projections 32c forming the upper surface of outer housing 32. The tapered recesses 30c guide the tapered projections 32c when the outer housing moves from its lower position to its upper position so that the two housings 30, 32 are aligned and structurally mated.

When the two housings 30, 32 are aligned and structurally mated, an outer housing opening 32d of outer housing 32 aligns with an inner housing opening 30d of inner housing 30 so as to provide a through opening 33 that enables passage of birdseed therethrough. When the outer housing 32 moves to its lower position, as shown in FIG. 3B, due to the presence of a squirrel on the perch assembly 34, the opening 32d moves out of alignment with the opening 30d and prevents access to the source of birdseed through opening 30d of inner housing 30.

As shown in FIGS. 2 and 5, the seed storage container 12 has a feed section 12a with vertically extending slots 12b positioned to cooperate with gussets 30a of the inner housing 30. When the gussets 30a are positioned in the slots 12b, threaded fastener holes 12c in the side of the feed section 12a are aligned with the threaded fastener holes 30b in the inner housing 30. Threaded fasteners 70, 72 initially pass through holes 30b, then through holes 12c, and are finally secured by nuts 74 contained within the anchor block 58f located on top of receptacle 58 to assemble the seed container 12 onto the top of the inner housing 30.

Two of projections 32c of the outer housing 32 preferably include flared portions 32e. These flared portions 32e allow the projections 32c to pass over the heads 70a, 72a of the threaded fasteners 70, 72 when the outer housing 32 is in its upper position.

Figure 4:
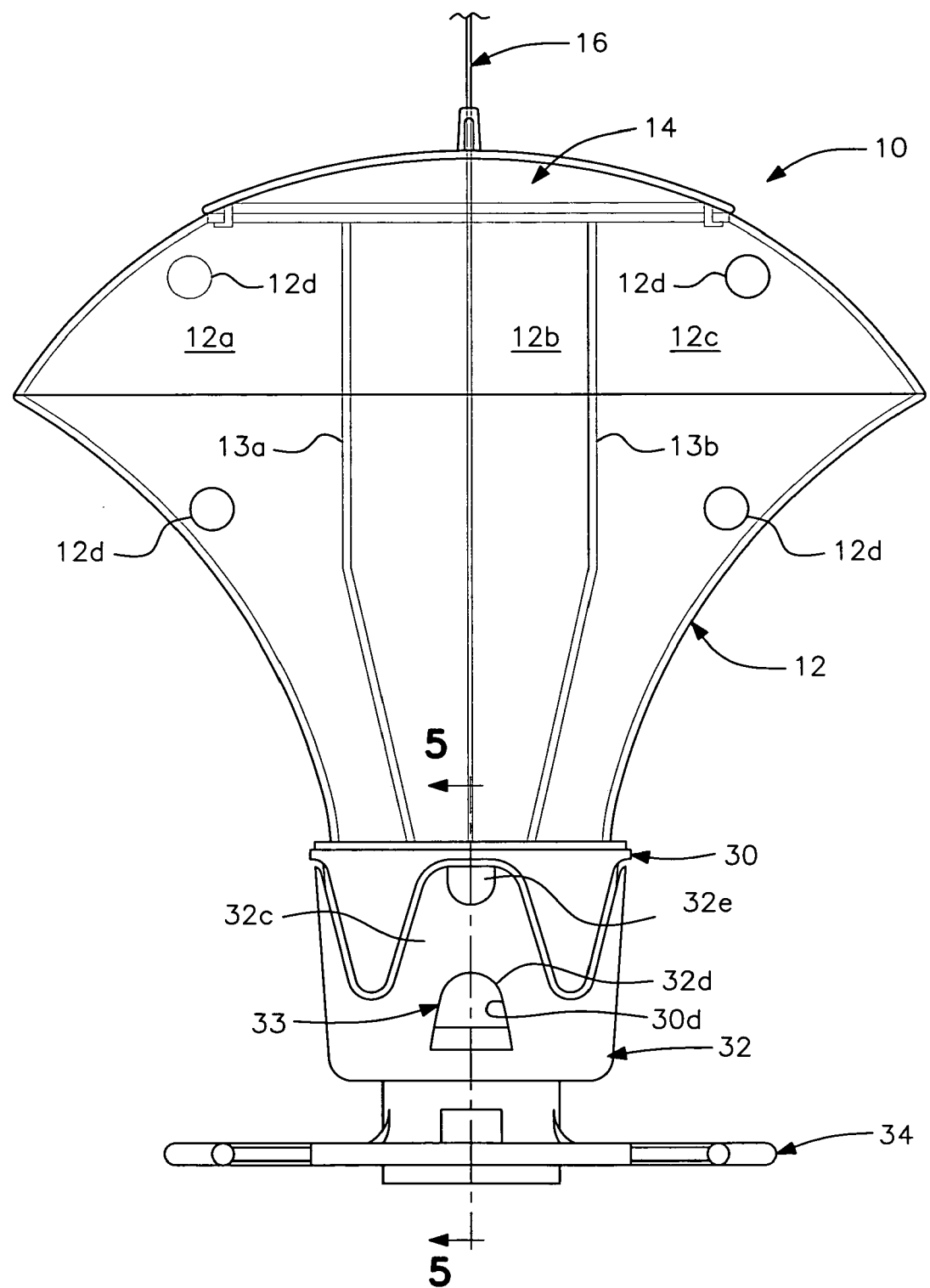
FIG. 4 is a side elevational view of the bird feeder of FIG. 1 with the outer housing in the upper position.
Figure 6:
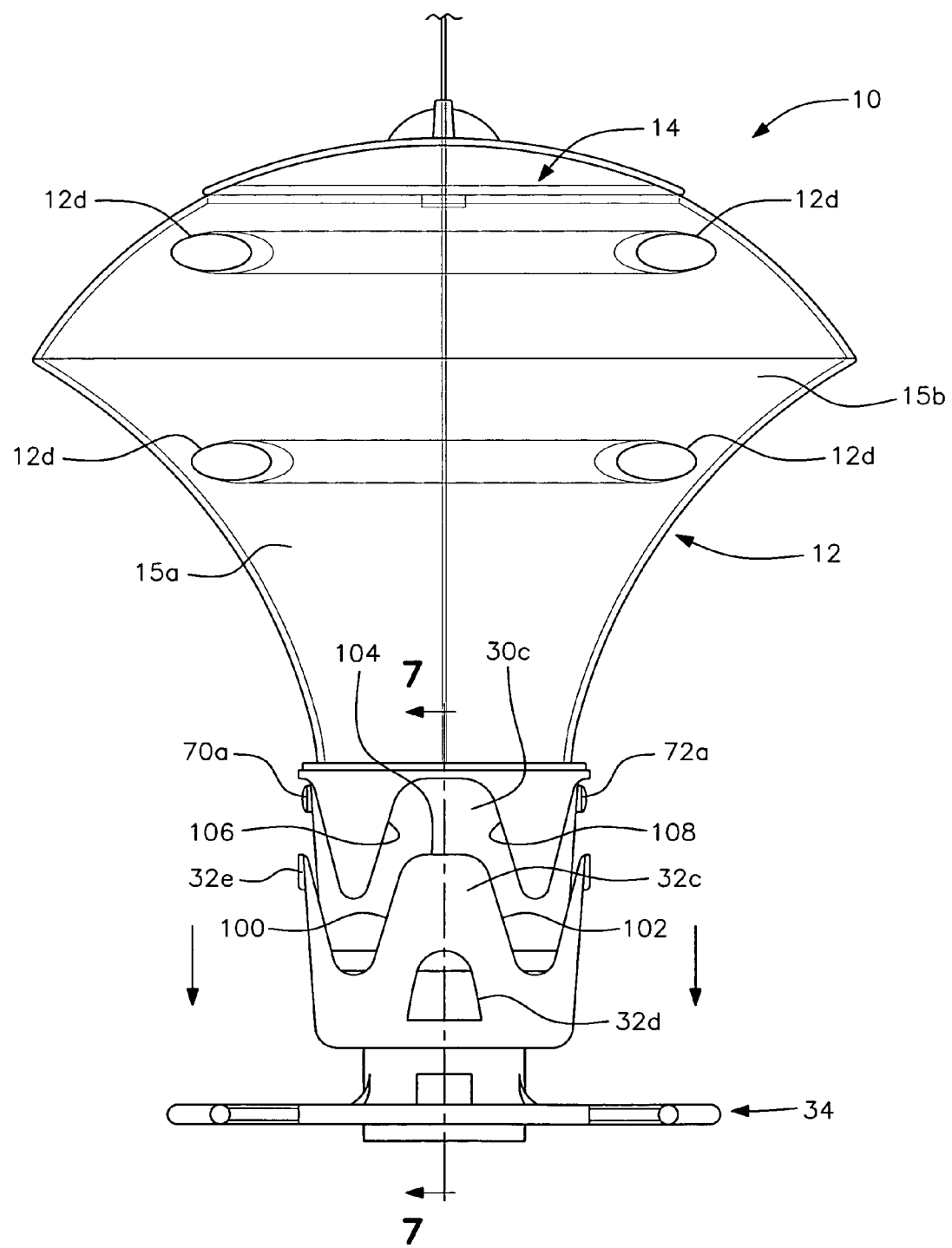
FIG. 6 is a side elevational view of the bird feeder of FIG. 1 with the outer housing in its lower position, and with the bird feeder rotated 90° with respect to the position shown in FIG. 4.
Figure 7:
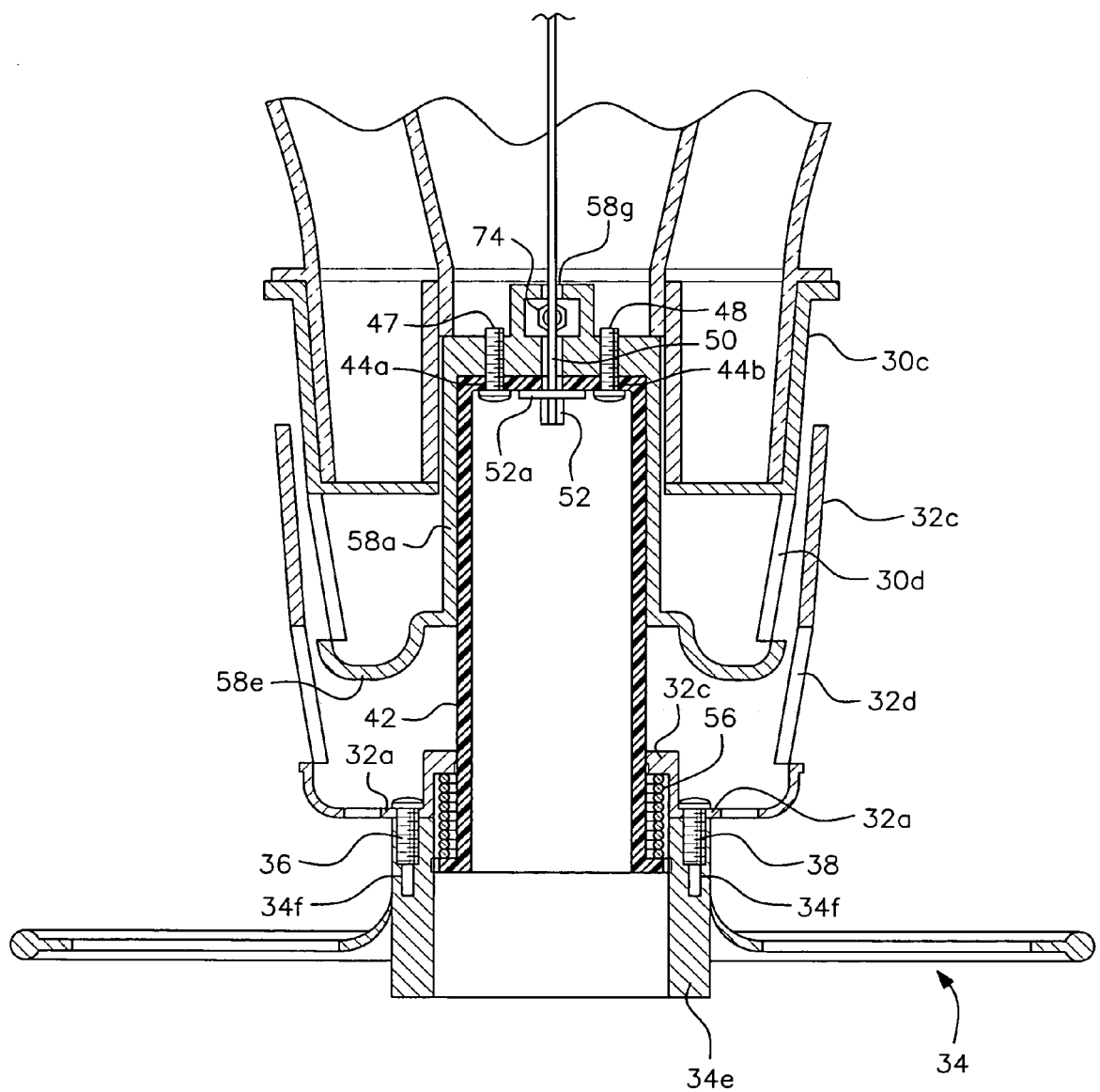
FIG. 7 is a partial sectional view of the bird feeder taken along line 7-7 of FIG. 6.
Figure 8:
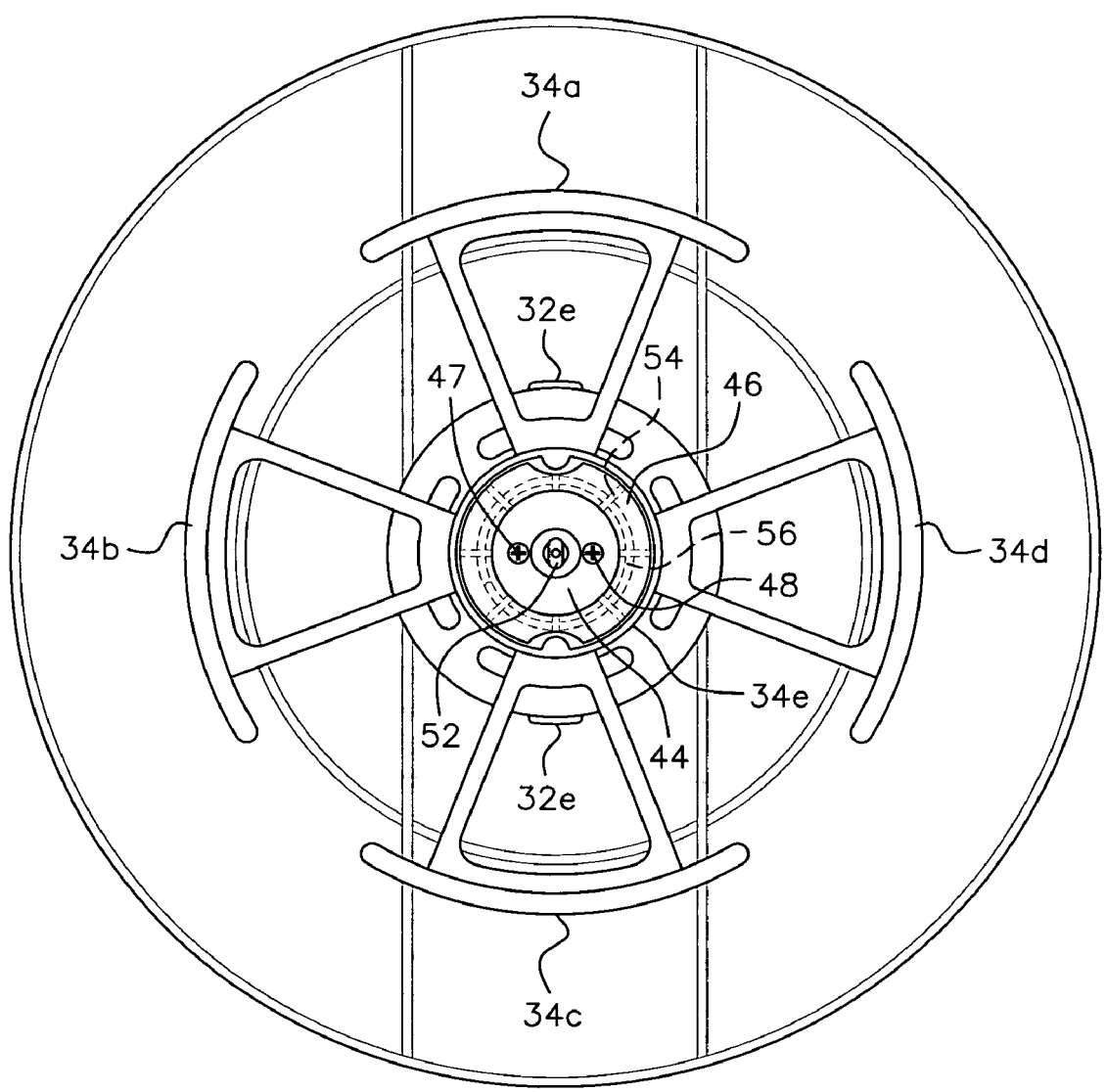
FIG. 8 is a bottom view of the bird feeder of FIG. 1, and illustrates the location of the compression spring between an exterior surface of the spring socket and an interior surface of a hub of the perch assembly that is attached to the outer housing.

FIG. 4 is a side elevational view of the bird feeder 10 with the outer housing 32 in its upper position. As shown, the upper housing 30 and lower housing 32 are in position to allow access through the through openings 33 to birdseed in compartments 12a, 12b, 12c of the container 12 formed by vertical dividers 13a, 13b. FIG. 6 is a side elevational view of the bird feeder 10 with the outer housing 32 in its lower position, and with the bird feeder 10 rotated 90° with respect to the position shown in FIG. 4. FIG. 7 is a partial sectional view of the bird feeder 10 taken along line 7-7 of FIG. 6. FIG. 8 is a bottom view of the bird feeder 10, and illustrates the central location of the compression spring 56 around the vertical axis of the feeder and between the exterior surface of the spring socket 40 and the interior surface of the hub 34e of the outer housing perch assembly 34.

In a preferred embodiment the container 12 is formed as two substantially identical molded half shells 15a,15b. The half shells preferably include half partitions molded into the half shells to form partitions 13a,13b, when the half shells are assembled. Passageway openings 12d are provided in the half shells 15a,15b to accommodate a fastening assembly, such as a bolt and nut set, for joining the two half shells together to form the container 12.

Compression spring 56 is operatively connected with the outer housing 32 to urge the outer housing 32 toward its upper position in mating relation with the inner housing 30. The compression spring is selected so as not to be overcome by the weight of an average bird (or of several average birds), but readily overcome by the weight of an average squirrel, typically about 9.5 ounces. Thus, the presence of a squirrel on the perch assembly 34 will cause the outer housing 32 to move to its lower position, and thus eliminate the through openings 33. Conversely, removal from the perch assembly 34 of the load heavier than the predetermined weight causes the compression spring 56 to uncompress, moving the outer housing 32 from its lower position to its upper position, thereby again to provide access to the birdseed.

That is, as shown in FIGS. 6 and 7, when a squirrel is present on the perch assembly 34, the outer housing 32 separates from the inner housing 30 due to the weight of a squirrel overcoming the force of compression spring 56. In the position shown in FIG. 6, the projection 32c includes two inwardly tapering sidewalls 100, 102. The sidewalls terminate in a horizontal upper surface 104. When the outer housing 32 moves from its lower position (shown in FIG. 6) to its upper position (shown in FIG. 4), the tapered sidewalls 100, 102 engage outwardly tapered sidewalls 106, 108 defined by the recesses 30c of the inner housing 30. To provide the desired amount of engagement, the sidewalls 100, 102, 106, and 108 are preferably tapered at an angle of from approximately 60° to approximately 80°, and still more preferably at an angle of approximately 70°.

Therefore, if there is any twisting or torquing of the lower housing 32, such as by example, the movement of a squirrel leaving the perch assembly 34, the sidewalls 100 engage the sidewalls 106, or the sidewalls 102 engage the sidewalls 108, depending upon the direction of twisting of the perch assembly 34, so as to guide the projections 32c of the outer housing 32 into the recesses 30c of the inner housing 30. The openings 32d of the outer housing 32 thereby align with the openings 30d of the inner housing 30 so as to once again structurally mate the housings and provide the through opening 33.

When the squirrel leaves the perch assembly 34, the compressed spring 56 (as shown prior to unloading in FIG. 7), expands to a less compressed or uncompressed state (shown in FIG. 5), and thereby returns the outer housing 32 to its original upper position in engagement with the inner housing 30. Birds are thereby again permitted access to the birdseed conveyed from container 12 to the opening 30d of the inner housing 30.

In a preferred embodiment, the compression spring 56 has an uncompressed length of approximately 4.25 inches, and a fully compressed length of approximately 0.30 inches. When the compression spring 56 is compressed to 1.35 inches, the measured spring force is approximately 16+/−1 ounces. The compression spring 56 can, however, have characteristics different from those described herein, such as a different spring force, depending upon the particular service in which the feeder 10 is to be used.

The mating housings 30, 32 are preferably made of die cast zinc or other durable and sturdy metals or materials. The mating housings 30, 32 are preferably substantially cylindrical in shape and have the associated hanging wire assembly 16 for supporting the same.

Further, by positioning the compression spring 56 around the cylindrical wall section 42 of the spring socket 40 on flange 46, and inside the perch assembly hub 34e and flange 32a of the outer housing 32, the compression spring 56 is insulated from contact with birdseed or other contaminants which might interfere with its operation.

The foregoing is considered as illustrative only of the principles of the invention. Further, since numerous modifications and changes may readily occur to those skilled in the art, it is not desired to limit the invention to the exact construction and operation described and shown. For example, one embodiment of the feeder 10 has been described above as including the hanging wire assembly 16 for maintaining the feeder in a substantially vertical orientation. In another possible embodiment of the invention, however, the feeder can be supported from below, such as mounting the inner housing on top of a pole or post. Accordingly, all suitable modifications and equivalents may be resorted to that fall within the scope of the invention as defined by the following claims.

What is claimed is:

1. A spring operated squirrel proof bird feeder comprising:
an inner housing telescopically and slidably surrounded by an outer housing;
said inner housing in communication with a source of birdseed and having an opening in an inner housing side wall;
said outer housing having an opening in an outer housing side wall, said outer housing being capable of substantially vertical movement between a first position at which said outer housing opening is in substantial alignment and communication with said inner housing opening so as to provide a through opening to provide access to the birdseed, and a second position at which said outer housing opening is in substantial misalignment and non-communication with said inner housing opening so as to restrict access to the birdseed; and
a compression spring operatively interconnecting said inner and outer housings such that transmission to said outer housing of a load heavier than a predetermined weight compresses said spring and moves said outer housing from said first position to said second position, and such that removal from said second housing of the load heavier than the predetermined weight uncompresses said spring and moves said outer housing from said second position to said first position;
said inner and outer housings each configured to have complementary shaped opposed surfaces that mate with one another so as to resist twisting movement of the outer housing relative to said inner housing as said outer housing moves between said first and second positions so as to guide movement of the housings away from and toward each other in a substantially vertical direction, one of said inner and outer housings including an exterior surface having a plurality of tapered recesses therein, and the other of said inner and outer housings including a plurality of tapered projections forming an upper surface of said outer housing and complementary in shape to said tapered recesses, said tapered recesses and said tapered projections forming said opposed mating surfaces and being engaged with one another when said outer housing moves from said second position to said first position.

2. The bird feeder according to claim 1, wherein each of said tapered recesses includes a generally horizonal upper edge from which pair of opposed outwardly tapering sidewalls extend downwardly, and each of said tapered projections includes a generally horizontal upper surface from which a pair of opposed inwardly tapering sidewalls extend upwardly.

3. The bird feeder according to claim 2, wherein said tapered recess sidewalls and said tapered projection sidewalls taper at an angle of from about 60° to about 80°.

4. The bird feeder according to claim 1, further comprising a birdseed storage container mounted above said inner housing to feed birdseed to said inner housing by gravity.

5. The bird feeder according to claim 1, wherein said outer housing includes a perch assembly for supporting birds.

6. The bird feeder according to claim 5, wherein said perch assembly includes a central hub and a plurality of vanes extending radially outwardly therefrom for bird support.

7. The bird feeder according to claim 6, further comprising a spring socket which extends through said hub of said perch assembly and said outer housing, said compression spring surrounding said spring socket and said spring being confined between said spring socket and said outer housing to insulate said spring from birdseed and other contaminants.

8. The bird feeder according to claim 7, wherein said inner housing includes a centrally located receptacle for housing a portion of said spring socket, said spring socket being secured at an upper end to said receptacle.

9. The bird feeder according to claim 1, further comprising a hanging wire assembly for suspending said feeder in a substantially vertical orientation, said assembly including a wire anchored centrally inside a spring socket of said inner housing, said spring socket having a cylindrical wall section that extends from a top plate to which said wire is anchored to a downwardly facing cylindrical opening to define a receptacle that is configure to receive a generally vertical upstanding post as an alternative to suspending the feeder with said hanging wire assembly.

10. A spring operated squirrel proof bird feeder comprising:

an inner housing having a birdseed storage container mounted thereabove for gravity feeding birdseed to said inner housing and having a plurality of openings in a side wall of said inner housing, an exterior surface of said side wall having a tapered recess formed therein including a pair of outwardly tapering sidewalls that extend downwardly;

an outer housing having a perch to support birds and a side wall with opening therein and upper surface shaped with a tapered projection including a pair of inwardly tapering sidewalls that extend upwardly toward said inner housing and complementary in shape with said recess in said inner housing exterior surface so as to mate therewith and resist twisting movement of one housing relative to the other, said outer housing being capable of sliding between an upper position at which said outer housing upper wall is engaged within said recess in said inner housing exterior surface and said inner housing opening are in substantial alignment with said outer housing openings so as to provide a plurality of through openings for access to birdseed in said inner housing, and a lower position at which said inner housing openings are in substantial misalignment with said upper housing openings so as to restrict access to the birdseed; and a compression spring centrally located around a vertical axis of the feeder and adjacent a lower end thereof, said spring operatively connected between a base of the inner housing and a top of the outer housing such that loading of said perch by a weight heavier than a predetermined amount compresses said spring and slides said outer housing downward to said lower position and removal of said load uncompresses said spring and slides said outer housing upward to said upper position.

11. The birdfeeder according to claim 10, wherein said perch assembly includes a central hub and a plurality of vanes extending radially outwardly therefrom for bird support.

12. The birdfeeder according to claim 11, wherein said inner housing includes a spring socket which extends through said central hub, said compression spring surrounding said spring socket and being confined between said spring socket and said outer housing.

13. The birdfeeder according to claim 12, wherein said inner housing includes a centrally located receptacle for housing a portion of said spring socket, an upper end of said spring socket being secured to said receptacle.

14. The birdfeeder according to claim 12, wherein said spring socket has a cylindrical wall section and a radially outwardly extending support flange at a base of said cylindrical wall section, a lower end of said compression spring being seat on said support flange and an upper end of said compression spring being seat against an inwardly directed flange on said outer housing.

15. The birdfeeder according to claim 10, further comprising a hanging wire having a lower end fixedly connected centrally within said inner housing and extending centrally up through said birdseed storage container to a top attaching end above said storage container.

16. The birdfeeder according to claim 10, wherein said birdseed storage container is formed from two substantially identical molded half shells which are interconnected together to form said birdseed storage container, said half shells including unitary half dividers which, when said half shells are interconnected, form dividers in said storage container.

17. A spring operated squirrel proof bird feeder comprising:

an inner housing having a birdseed storage container mounted thereabove for gravity feeding birdseed to said inner housing and having a plurality of openings in a side wall of said inner housing;

an outer housing having a perch to support birds and a plurality of complementary shaped openings in a side wall of said outer housing, said outer housing being capable of sliding between an upper position at which said inner housing openings are in substantial alignment with said outer housing openings so as to provide a plurality of through openings for access to birdseed in said inner housing, and a lower position at which said inner housing openings are in substantial misalignment with said upper housing openings so as to restrict access to the birdseed; and a compression spring centrally located around a vertical axis of the feeder and adjacent a lower end thereof, said spring operatively connected between the inner housing and the outer housing such that loading of said perch by a weight heavier than a predetermined amount compresses said spring and slides said outer housing downwardly to said lower position and removal of said load uncompresses said spring and slides said outer housing upwardly to said upper position;

said inner and outer housings having complementary guiding surfaces to guide substantially vertical movement of the housings between said lower position and said upper position, one of said inner and outer housings having an exterior surface with a plurality of tapered recesses therein, and the other of said inner and outer housings including a plurality of tapered projections forming an upper surface of said other housing and complementary in shape with said tapered recesses, said tapered recesses and said tapered projections forming said complementary guiding surfaces and being engaged with one another when said outer housing moves from said upper position to said lower position;

a hanging wire having a lower end anchored to said inner housing and extending upwardly through said bird seed storage container and terminating in an upper end for suspending said feeder in a substantially vertical orientation; and said inner housing configured with a downwardly facing opening sufficient to support said birdfeeder on a generally vertical upstanding post as an alternative to suspending said feeder with said hanging wire.

18. The birdfeeder according to claim 17, wherein said inner housing includes a centrally located receptacle positioned below said birdseed storage container, said receptacle having an open bottom formed by said downwardly facing opening such that a post used to mount the birdfeeder from the ground is received within said receptacle, said hanging wire being secured at an upper end of said receptacle and beneath said birdseed storage container.

* * * * *